(12) United States Patent
Wegner et al.

(10) Patent No.: US 6,393,016 B2
(45) Date of Patent: *May 21, 2002

(54) TELEPHONY SIGNAL TRANSMISSION OVER A DATA COMMUNICATIONS NETWORK

(75) Inventors: Martin T. Wegner, Barrington; Omprasad S. Nandyal, Bloomingdale, both of IL (US); Antonio Dutra, Buffalo, NY (US); Randy S. Storch, Highland Park; Benjamin Kamen, Deerfield, both of IL (US)

(73) Assignee: Net2Phone, Inc., Newark, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,095

(22) Filed: Nov. 14, 1997

Related U.S. Application Data (63) Continuation-in-part of application No. 08/582,475, filed on Jan. 4, 1996, now Pat. No. 5,712,907, which is a continuation of application No. 08/529,923, filed on Sep. 18, 1995, now abandoned.

(51) Int. Cl.[7] .......................... H04L 12/54; H04L 12/66; H04M 11/00; H04N 1/36
(52) U.S. Cl. .......................... 370/352; 370/428; 379/93; 358/409
(58) Field of Search .............................. 370/352, 428, 370/466, 467, 255, 278, 290, 474; 379/93, 93.24, 94, 97, 112, 133, 243, 283, 221, 220, 227; 358/402, 409, 440, 468

(56) References Cited

U.S. PATENT DOCUMENTS

| | | | |
|---|---|---|---|
| 4,207,598 A | 6/1980 | Reich et al. | 358/257 |
| 4,410,765 A | 10/1983 | Hestad et al. | 179/7.1 R |
| 4,594,477 A | 6/1986 | Noirot | 179/18 AD |
| 4,788,721 A | 11/1988 | Krishnan et al. | |
| 4,901,341 A | 2/1990 | Carter et al. | |
| 4,972,464 A | 11/1990 | Webb et al. | 379/112 |
| 5,131,024 A | 7/1992 | Pugh et al. | 379/67 |
| 5,142,570 A | 8/1992 | Chaudhary et al. | 379/221 |
| 5,289,536 A | 2/1994 | Hokari | 379/234 |
| 5,337,352 A | 8/1994 | Kobayashi et al. | |
| 5,369,686 A | * 11/1994 | Dutra et al. | 379/94 |
| 5,400,395 A | 3/1995 | Berenato | 379/114 |
| 5,406,557 A | 4/1995 | Baudoin | 370/61 |
| 5,414,754 A | 5/1995 | Pugh et al. | 379/67 |
| 5,425,085 A | 6/1995 | Weinberger et al. | 379/112 |
| 5,473,630 A | 12/1995 | Penzias et al. | 375/114 |
| 5,481,604 A | 1/1996 | Minot | |
| 5,509,061 A | 4/1996 | Amereller et al. | 379/207 |
| 5,521,910 A | 5/1996 | Matthews | 370/54 |
| 5,521,970 A | * 5/1996 | Herrick et al. | 379/201 |
| 5,550,910 A | 8/1996 | DeJager | 379/220 |
| 5,570,417 A | 10/1996 | Byers | 379/115 |
| 5,572,581 A | * 11/1996 | Sattar et al. | 379/201 |
| 5,694,428 A | * 12/1997 | Campana, Jr. | 375/260 |
| 5,737,531 A | * 4/1998 | Ehley | 395/200.38 |

OTHER PUBLICATIONS

NetXchange Communications Ltd., "Corporate Fax Exchange," 1996.

* cited by examiner

*Primary Examiner*—Alpus H. Hsu
*Assistant Examiner*—Duc Ho
(74) *Attorney, Agent, or Firm*—Shaw Pittman LLP (57) ABSTRACT

A control process controls transmission of digitally encoded messages (DEMs) over a data communications network to allow real-time performance. The control process establishes a communication path which DEMs are sent. The control process can operate according to any data communications protocol, including the protocol native to the communicating device. The control process can establish communication paths based upon least-cost routing determinations. When there is insufficient bandwidth or excessive latency, the control process can choose a secondary path over which to transmit a DEM.

28 Claims, 7 Drawing Sheets

TELEPHONY SIGNAL TRANSMISSION OVER A DATA COMMUNICATIONS NETWORK

This application is a continuation-in-part of application Ser. No. 08/582,475, filed on Jan. 4, 1996 U.S. Pat. No. 5,712,907, which is a continuation of application Ser. No. 08/529,923, filed on Sep. 18, 1995 abandoned, which is hereby incorporated by reference in its entirety.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The portion subject to copyright protection has been defined by placing one copyright notice just prior to the beginning of the copyrighted portion, and placing a second copyright notice just after the end of the copyrighted portion.

BACKGROUND

1. Field of the Invention

The present invention relates to real-time distribution of digitally encoded messages over a data network, such as the Internet. More specifically, the present invention relates to a system and method for controlling transmission of digitally encoded messages using any desired communication protocol, including the native protocol of the communicating devices.

2. Background of the Invention

Figure 1:
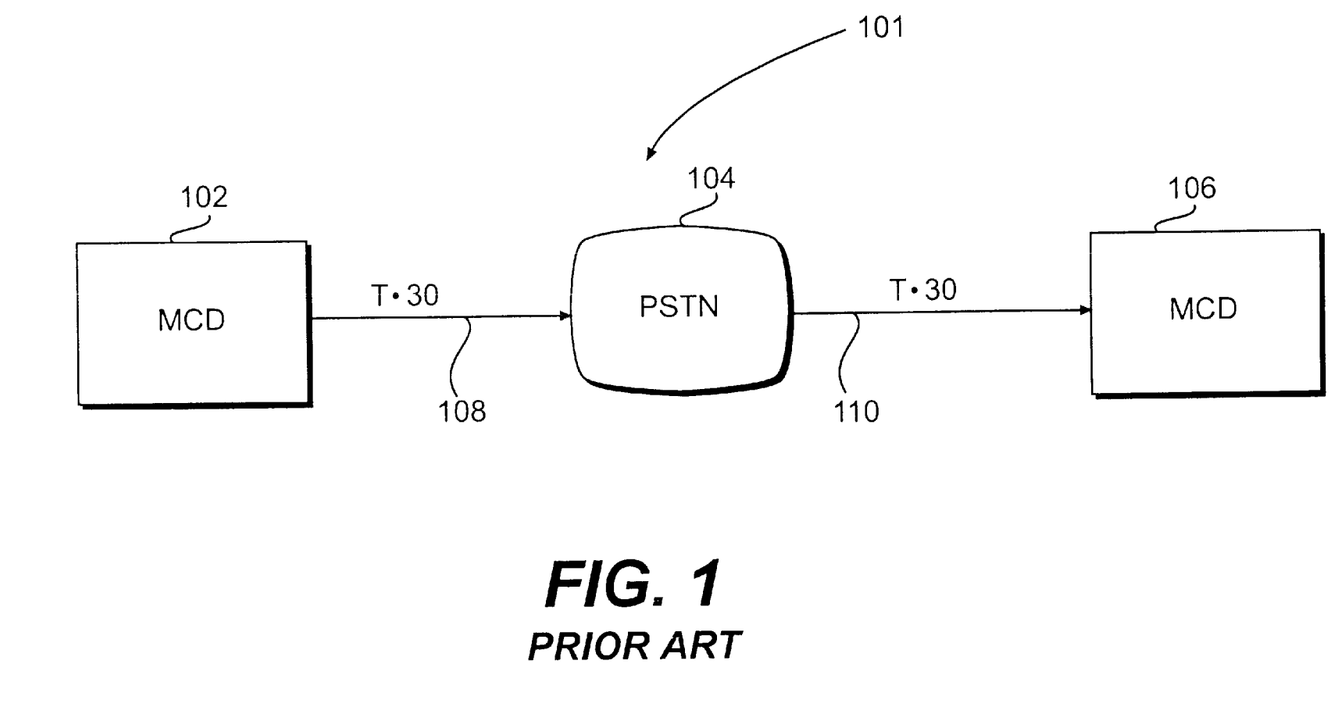
FIG. 1 is a schematic diagram of a prior art system for real-time transmission of DEMs using a PSTN.

FIG. 1 is a schematic diagram of a prior art system 101 for real-time transmission of digitally encoded messages (DEMs). Where MCDs 102 and 106 are fax machines, for example, the DEMs are fax messages. MCD 102 sends a DEM to MCD 106. MCD 102 sends telephony data representative of a DEM to a public-switched telephone network (PSTN) 104 over line 108 using the T.30 protocol. Likewise, the PSTN transmits the telephony data to MCD 106 over line 110 using the T.30 protocol.

The PSTN 104 of system 101 has two attributes that facilitate transmission of DEMs. First, the PSTN 104 provides a guaranteed bandwidth. Once a connection is made, MCD 102 and MCD 106 communicate using the full bandwidth allocated to the telephony connection provided by the PSTN 104. Second, there is a guaranteed latency between the time that MCD 102 sends the telephony data and the time MCD 106 receives the telephony data.

The PSTN-based transmission of DEMs suffers from several disadvantages. First, long distance charges must often be incurred in completing the DEM transmission from MCD 102 to MCD 106. Second, the bandwidth of the telephony connection is limited relative to other forms of communication such as communication over data networks. Third, even with full bandwidth of the telephony connection available, many data transfer protocols (for example, fax) can be conducted using less than one tenth—and are designed to use no more than one half—of the full bandwidth available.

Figure 2:
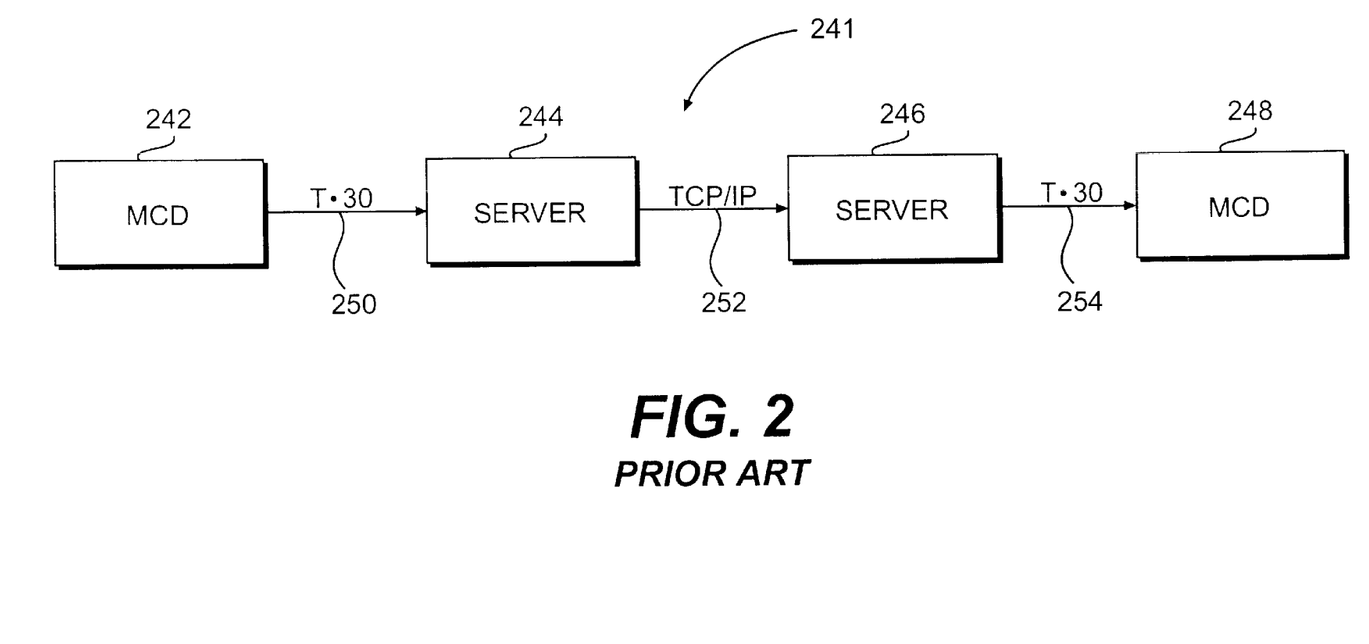
FIG. 2 is a schematic diagram of a prior art system for transmitting DEMs over a data communication network

To avoid the disadvantages associated with system 101, DEMs have been transmitted over data communication networks, for example, the Internet. FIG. 2 illustrates a schematic of a prior art system 241 for transmitting DEMs over a data network. In system 241, MCD 242 transmits telephony data representative of a DEM to a server 244 over line 250 using the T.30 protocol. Server 244 is assumed to be equipped with a data conversion card (not shown) to convert the telephony data to computer data. Server 244 transmits the computer data to a server 246 over line 252 using the TCP/IP protocol. Line 252 represents a computer network, for example the Internet. The server 246 converts the computer data to telephony data using a card (not shown). The telephony data is transmitted to MCD 248 over line 254 using the T.30 protocol.

There are two disadvantages associated with system 241. First, there is no guaranteed bandwidth. Although a computer network is capable of providing greater bandwidth than a telephony-based system, there is no guarantee that any bandwidth will be available when it is needed, unless, possibly, the network is dedicated to the transmission of DEMs. Second, there is no guaranteed minimum latency. Thus, there is no guarantee that a DEM sent by MCD 242 will reach MCD 248 within any minimum delay. This is problematic with many DEM transmissions because the MCD 242 and MCD 248 generally must maintain synchronization with one another. For example, where MCDs 242 and 248 are fax machines, they must resynchronize with one another at the end of each transmitted page. For fax machines, this resynchronization must occur within 5 to 7 seconds. If the required resynchronization does not occur within the required time frame, MCDs 242 and 248 will assume that the connection has been lost and they will hang up. Unfortunately, latency over a data network such as the Internet can be on the order of 30 seconds or more. Thus, the prior art system 241 will likely cause disrupted DEM delivery due to lost connections resulting from loss of synchronization because no minimum latency can be guaranteed.

DEFINITIONS

"DEM," as used herein, shall mean digitally encoded message.

"MCD," as used herein, shall mean message communicating device. A facsimile machine is one example of an MCD.

"PSTN," as used herein, shall mean public-switched telephone network.

"DCN," as used herein, shall mean data communications network, including, but not limited to, wide area networks, intracompany networks, intercompany networks and other internodal networks such as the Internet.

SUMMARY OF THE INVENTION

The present invention solves the problems associated with conventional systems by providing a control process to handle the protocol among nodes transferring DEMs over a data communications network. The control processes on the various nodes communicate with one another to determine any particular node's availability for message communication. If a connection is made for message communication, the control processes on the communicating nodes control message transfer according to a particular protocol, and transfer the DEMs over the DCN in real time. The protocol can be any data communications protocol, including the data communications protocol native to the communicating devices.

The control process in the preferred embodiment includes a parent process and a child process. The parent process is responsible for managing communication between nodes, i.e., the parent process is responsible for managing the DCN aspects of a DEM communication. DEM communication is also referred to herein as a DEM transaction. Thus, the parent process isolates the child process from DCN related functions. The child process controls the hardware aspects of a DEM communication. This control includes managing telephony hardware and performing any telephony related functions. The child process, therefore isolates the parent process from the hardware aspects of DEM communication. Preferably, the child process communicates with a particular MCD using its native protocol. The parent and child work together according to a protocol to ensure that DEM communications are established within the latency time required to maintain synchronization.

When DEMs cannot be transmitted over the data communications network, the control process attempts to route DEMs over a secondary path. The secondary path is also a data network. Thus, the bandwidth and cost advantages associated with transmitting DEMs using data networks rather than telephony lines are preserved. In addition, the secondary path provides an auxiliary route for DEMs when they cannot be immediately transmitted over the primary DCN.

The secondary path of the preferred embodiment includes two store-and-forward servers. The first store-and-forward server is operatively coupled to a DEM server on the sending side of the data network. The second store-and-forward server is operatively coupled to a DEM server on the receiving side, and also to the first store-and-forward server. In operation, when the primary path is unavailable, the sending-side DEM server transmits DEMs from the sender MCD to the first store-and-forward processor, where they are stored. Subsequently, the first store-and-forward processor delivers the DEM to the second store-and-forward processor. The second store-and-forward processor then sends the DEM to the receiver-side DEM server where it will be delivered to a receiver MCD.

The secondary path for DEM transmission allows the present invention to complete DEM transmission in real-time when the primary path is unavailable for DEM transmission.

Thus, one objective of the present invention is to provide a minimum guaranteed latency between the time that a digitally encoded message is sent over a DCN and the time that it is received.

Another object of the present invention is to provide real-time transmission of digitally encoded messages.

Yet another object of the present invention is to provide cost-efficient digitally encoded message transmission in real-time using least-cost routing techniques.

Another object of the present invention is to provide communications over a DCN using any desired protocol, including the native protocol of the communicating devices.

Another objective of the present invention is to provide a backup communications option, such that it the real-time attempt fails for any reason, the sender has the option to allow a store-and-forward attempt to deliver a message along a secondary path These and other objects of the present invention are described in greater detail in the detailed description of the invention, the appended drawings and the attached claims.

DETAILED DESCRIPTION OF THE PREFERRED EMBODIMENTS

Figure 3:
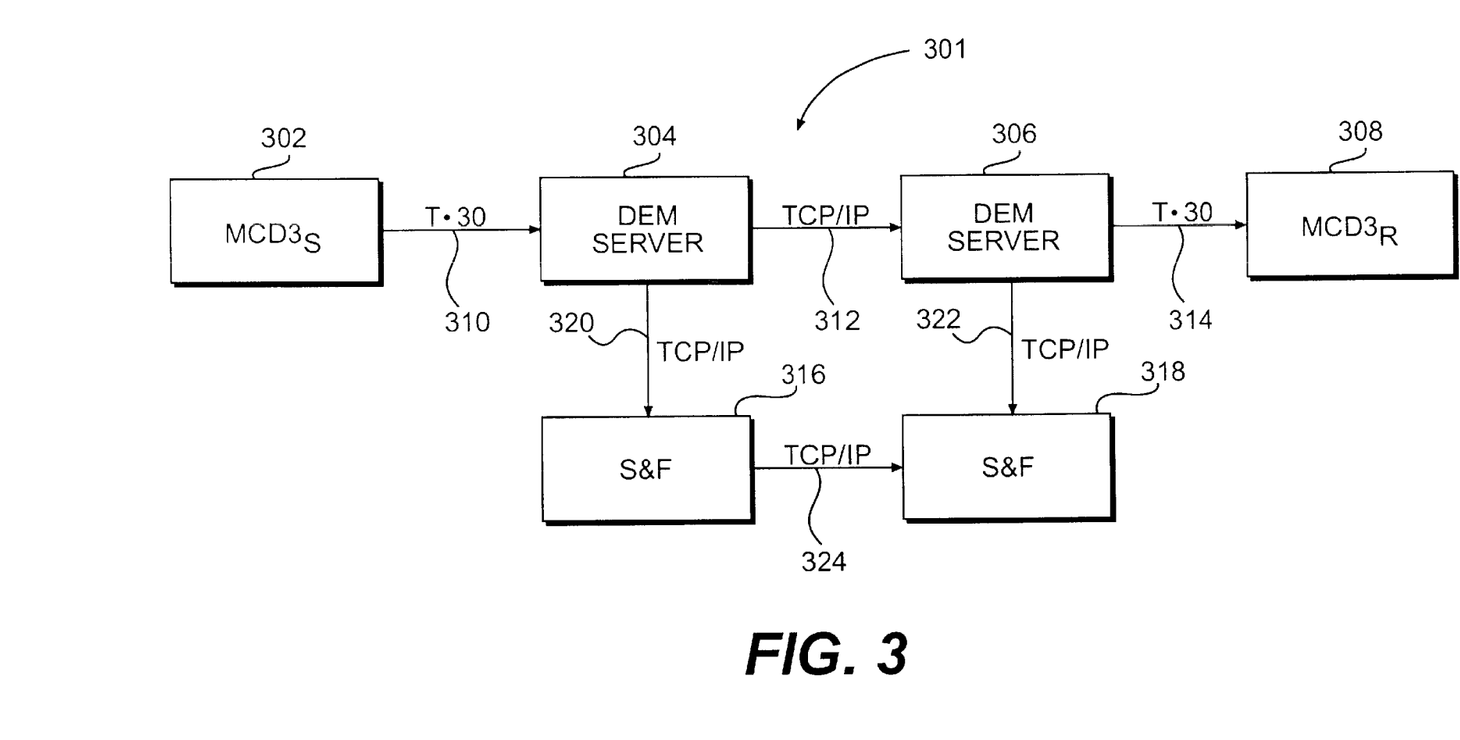
FIG. 3 is a schematic representation of a system operating in accordance with the present invention.

FIG. 3 is a schematic representation of a system 301 operating in accordance with the present invention. An MCD 3s is operatively coupled to a DEM server 304 over connection 310. The DEM server 304 is operatively coupled to a store-and-forward server 316 over connection 320. The store-and-forward server 316 is operatively coupled to a store-and-forward server 318 over connection 324. The store-and-forward server 318 is operatively coupled to a DEM server 306 over connection 322. The DEM server 306 is operatively coupled to DEM server 304 and MCD 3r. DEM servers 304 and 306 are preferably general purpose computers that have processes executing thereon to carry out the functions of the present invention. It would be apparent to those skilled in the art how to program such general purpose computers to carry out the functions described herein. The data connections 312, 320, 322 and 324 can conform to any communications protocol for digital data. Such communication protocols include TCP/IP and T.30.

In operation, a DEM is generated using MCD 3s. MCD 3s transmits the DEM to DEM server 304. In the preferred embodiment, MCD 3s is a fax machine. Thus, the transmitted data can be telephony data. In such case, the telephony data must first be converted to digital data. In the preferred embodiment, DEM server 304 converts the telephony data to digital data for transmission over a data network. The conversion can be performed by well-known hardware and/or software designed to convert telephony data to digital data. The DEM is transmitted over the data network to DEM server 306. If required, the DEM server 306 converts the DEM data to telephony data representative of the DEM. The telephony data is then transmitted to MCD 3r.

More sophisticated MCDs can convert the telephony data representative of the DEM internally or can communicate digitally by directly using digital representations of the DEM. These more sophisticated DEMs can transmit the DEM data directly over the network without the DEM server 304. Similarly, more sophisticated MCDs have the capability to receive the DEM without prior conversion to telephony data representative of the DEM. The functions described herein can be programmed into more sophisticated MCDs, which precludes the need for a separate DEM servers 304 and 306.

In the preferred embodiment, MCDs 3s and 3r are fax machines. To communicate correctly MCD 3s and MCD 3r must maintain synchronization. If synchronization is lost, the communication link between MCD 3s and MCD 3r is broken and the fax machines hang up. Any fax transmission occurring at the time of the hangup is lost. There is no guaranteed minimum latency time for DEM transmission over the connection 312. Connection 312 is representative of a DCN. For example, where connection 312 is the Internet, a DEM transmitted by DEM server 304 can take seconds, minutes, or hours to reach DEM server 306. As a result connections are often lost.

The present invention executes a novel control process alternately referred to as a lineman herein. The lineman is a process that executes on each DEM server in the system to control transmission of DEMs over the DCN. Using the lineman, the present invention allows communication using any data communications protocol, including the protocol native to the communicating devices. Where the communicating devices are fax machines, for example, the protocol can be the well-known T.30 protocol.

Figure 4:
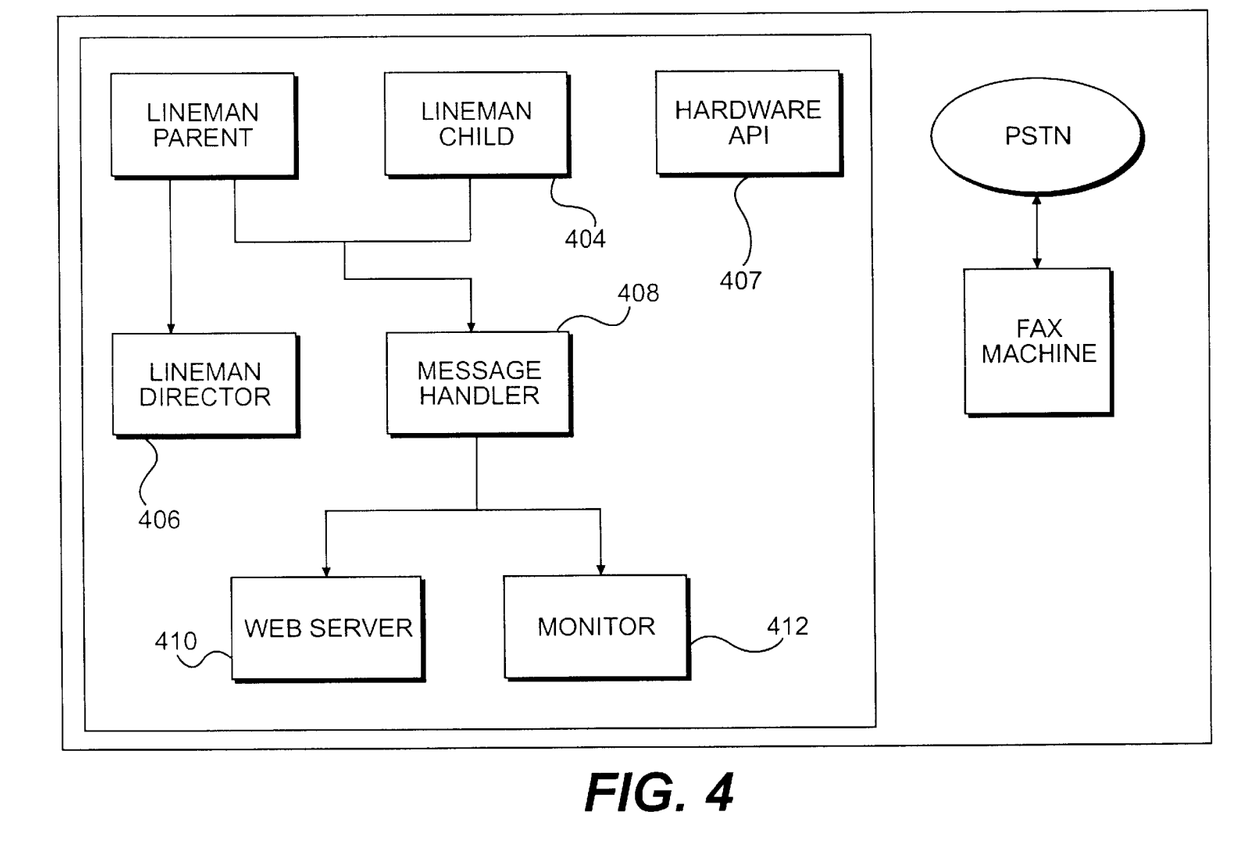
FIG. 4 is a schematic diagram of a control process for transmitting DEMs over a DCN.

FIG. 4 is a schematic of the lineman control process of the present invention. As illustrated in FIG. 4, lineman 401 includes a lineman parent 402, a lineman child 404 and a lineman director 406. In the preferred embodiment, the control process 401 can include a hardware API 407, a message handler 408, a Web server 410 and a monitor process 412.

Lineman director 406 is the controls allocation of available data communication ports on the DEM server on which it resides. Lineman director 406 determines which, if any, local data communication port is available to handle the outbound portion of a real-time DEM transaction. Lineman director 406 must make this determination quickly to avoid loss of synchronization during the DEM transaction.

In the preferred embodiment, lineman director 406 executes the following procedure to make its determination. The lineman 406 monitors a request port for incoming connection requests. In the preferred embodiment, this is a dedicated TCP/IP port to which remote linemen attempt to connect when they desire to initiate a DEM transaction with the local lineman. Remote linemen decide which local linemen is the correct lineman based on the output of their routing tables (described below). Lineman director 406 does not challenge this decision. Rather, it attempts to complete the transaction.

Once lineman 406 detects an incoming connection request on the dedicated request port, it must locate and reserve an available data communications port. It must locate and reserve the available data communications port quickly to avoid a synchronization loss to some other activity and must configure the available data communications port for outbound service.

If there is an available data communications port, lineman director 406 passes the new connection to the lineman parent 402. After the "pass off," lineman director 406 is no longer responsible for the connection. In the preferred embodiment, this "pass off" is handled by passing a file handler from lineman director 406 to lineman parent 402.

If there is no data communications port available, lineman director 406 must signal the calling lineman to inform it that there are no available data communication ports. Lineman director 406 then drops the connection. The calling lineman can then route the DEM using the secondary path described below to complete the transaction.

Lineman parent 402 controls the network side of a real-time DEM transaction. Lineman parent 402 separates the lineman child 404 from the network portion of the system. Lineman parent 402 is responsible for managing communications between itself and a like lineman parent of a remote lineman executing on a remote DEM server. The two lineman parents work in conjunction with one another to conduct the network half of a real-time DEM transaction. In the preferred embodiment lineman parent 402 communicates with lineman child 404 using conventional pipes.

Lineman child 404 controls the physical side of the real-time DEM transaction. Lineman child 404 separates lineman parent 402 from the hardware specific portion of the system. Lineman child 404 is responsible for conducting communication with the hardware using any protocol, including the hardware's native protocol. In the preferred embodiment, where the communicating MCDs are fax machines, lineman child 404 performs telephony control according to the well-known T.30 protocol. In the preferred embodiment, this telephony control includes detecting inbound ring, managing the telephony interface, making outbound calls and conducting the T.30 protocol. Any other required hardware control is performed by lineman child 404.

The preferred embodiment includes a Hardware API 407. The hardware API 407 contains all of the code and drivers necessary to interface with the resident fax/telephony hardware. In the preferred embodiment, lineman child 404 uses hardware API 407 to manage the physical fax channel. Hardware API 407 performs the following functions: (1) port selection, (2) inbound call direction; (3) outbound call generation; (4) DTMF tone generation and detection; (5) T.30 protocol negotiation; and (6) fax data transmission.

The message handler 408 is a local daemon responsible for interacting with the main message server. In the preferred embodiment, the main message server is a centralized message server which is responsible for maintaining system-wide activity logs and trouble reports. One key advantage of the present invention is that it can be used in a scalable architecture, while maintaining efficient DEM transmission over a DCN. As a result, it is not practical, nor desirable, for every process running on the lineman node to talk directly to the message server.

The message handler 408 is a local process running on the lineman that buffers and filters messages and information directed to the message server. It forwards only those messages and information that meet desired criteria to the message server. By doing so, the message handler controls the content of information passed to the centralized message server, thereby limiting the amount of traffic. The message handler also multiplexes the various messages generated by the lineman processes onto a single pipe, thereby limiting the amount of networking resources required by it and the message server.

In the preferred embodiment, message handler 408 is pre-configured to perform content thinning of messages to be sent to the message server. For example, a local administrator can enable or disable filters on each lineman process to limit the information that is sent to the message server. By default, in the preferred embodiment only error messages and transaction milestone messages are sent. For debugging purposes, however, more detailed messages can be enabled and sent.

The monitor 412 is a local daemon that performs monitoring and housekeeping services for a particular lineman. In the preferred embodiment, monitor 412 performs two functions: (1) system state monitoring, and (2) local SNMP agent functionality. In system state monitoring, monitor 412 tracks the state of each configured component running on the lineman. Should any component fail, monitor 412 records this action and then attempts to restart the failed component. Monitor 412 also provides local SNMP functionality for those configurations where direct SNMP agent functionality is required on the lineman.

The web server 410 in the preferred embodiment can be any conventional web server. Web server 410 is used to configure and troubleshoot the local lineman. Web server 410 provides a web-based view into the lineman. Using web server 410, administrators can access logging, tracking, and trouble shooting interfaces from any conventional web browser, such as Netscape and Apache.

The lineman parent 402 and lineman child 404 coordinating DEM transactions. In general, lineman parent 402 and lineman child 404 can allow DEM communication using any protocol to carry out the communication. This protocol can be the native protocol of the devices communicating with one another, for example two fax machines. Such protocols include the well-known T.30 and CCITT protocols.

Figure 5:
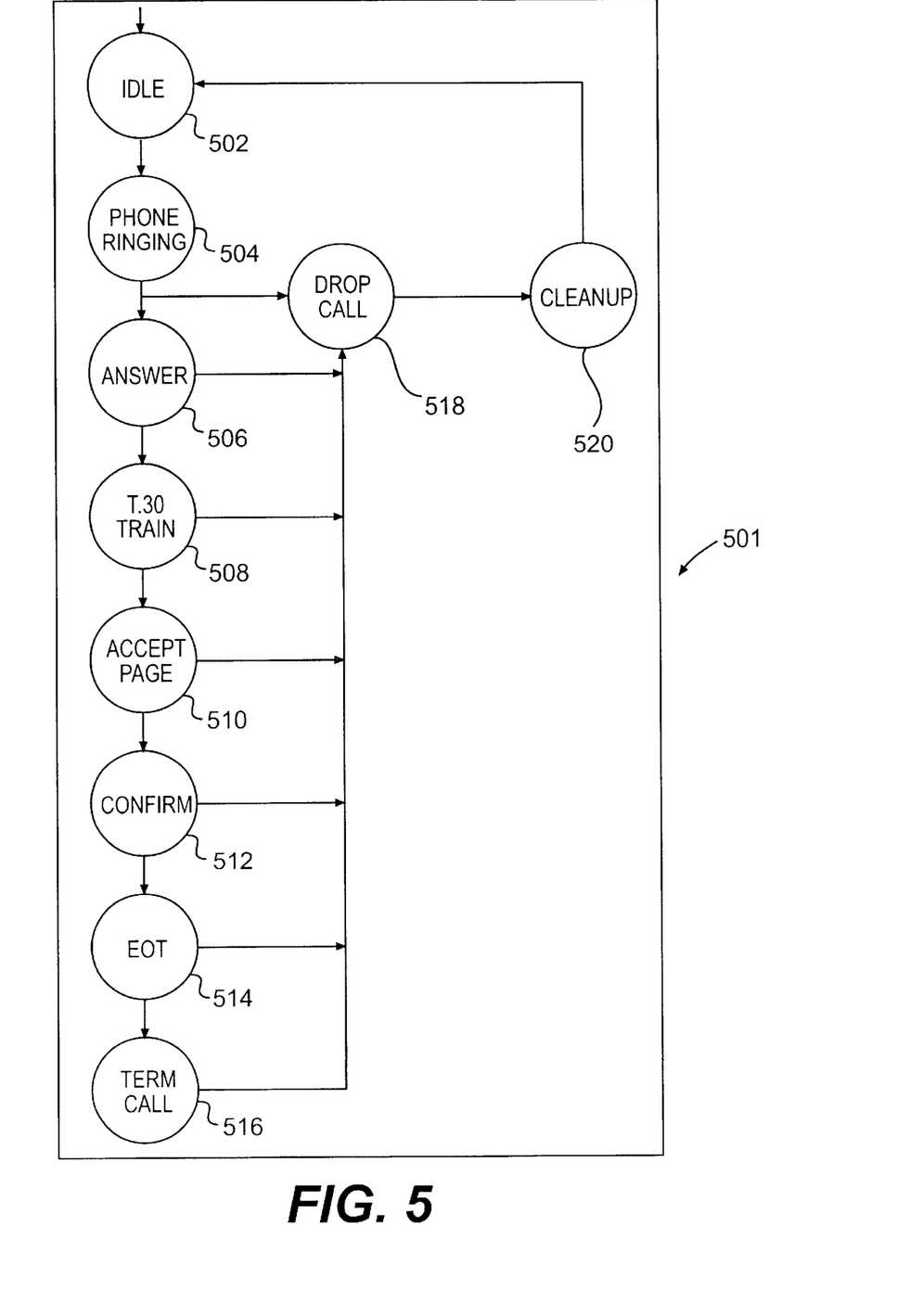
FIG. 5 is a state diagram of the states that a lineman child assumed when a lineman child is given notification that a call is inbound.
Figure 6:
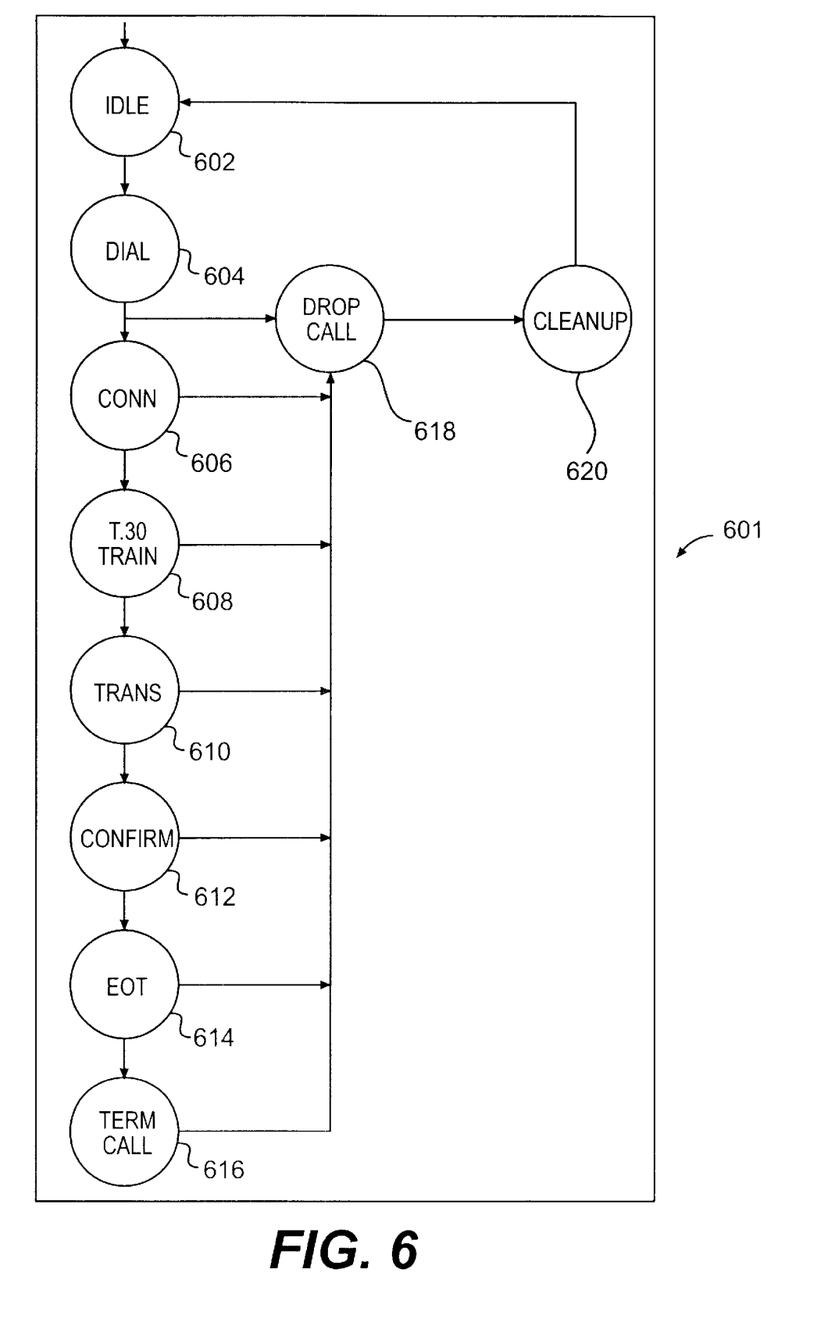
FIG. 6 is a state diagram of the states which lineman child assumes when lineman parent notifies the child that an outbound call is required.

FIGS. 5 and 6 illustrate schematically a process by which DEMs are transmitted according to a preferred embodiment of the present invention in which DEMs are fax messages. FIG. 5 illustrates the states that the lineman child 404 assumes when a user initiates sending a DEM, and is connected to the hardware within the lineman. Initially, the lineman child 404 is in the idle state 502. Upon an incoming call event, signified by a ringing signal, the lineman child 402 transitions to state 504. From state 504, lineman child 404 can answer the call by transitioning to state 506 or not answer the call by transitioning to state 518. If the lineman child answers the call by transitioning to state 506, it will then attempt to conduct a communication session using the T.30 protocol. After the session is set-up under the T.30 protocol, the lineman child 404 transitions to state 510 to begin acceptance of DEM transmissions. In the preferred embodiment, where the DEMs are facsimiles, the lineman child 404 transitions between states 510 and page confirmation state 512 until all pages of the facsimile have been accepted. When all pages of the facsimile have been accepted, i.e., acceptance of the DEM transmission is complete, the lineman child 404 transitions to state 514 to send an end of reception signal to indicate the end of DEM reception. The lineman child 404 then transitions to state 516 to terminate the telephone call. The lineman child 404 drops the call in state 518, performs any necessary cleanup in state 520 and returns to idle state 502 to await the next incoming or outbound call to be processed. At any point in states 506–514, an error or other event may cause communication to be disrupted resulting in a dropped call. If such an event should occur, the lineman child 404 drops the call in state 518, performs any necessary cleanup in state 520 and returns to idle state 502 to await the next incoming or outbound call to be processed.

FIG. 6 illustrates the states which lineman child 404 assumes when lineman parent 402 notifies the child that an outbound call is required. Initially, lineman child 404 is in idle state 602. Upon lineman parent's 402 notification to place an outbound call, lineman child 404 transitions to state 604 where lineman child 404 attempts to place the required call. After dialing a connection is established in which case lineman child 404 transitions to state 606, or the call is dropped in which case lineman child 404 transitions to state 618. If a connection is established, lineman child 404 transitions to step 608 where it begins a T.30 communication session. Upon successful initiation of the T.30 session, lineman child 404 begins the DEM transmission. Transmission of each portion of the DEM transmission can be confirmed. For example, in the preferred embodiment, where the DEM is a facsimile, each page of the DEM is sent followed by a confirmation. Thus, lineman child 404 repeatedly executes states 610 and 612 until all of the pages in the DEM have been transmitted. When the entire DEM has been transmitted (e.g., all pages of a facsimile transmission), lineman child 404 transitions to state 614 in which it transmits an end of transmission signal. Lineman child 404 then terminates the call in state 616, drops the call in state 618, performs any required cleanup in state 620, and transitions to idle state 602 to await the next incoming or outbound call to be processed. At any point in states 606–614, an error or other event may cause communication to be disrupted resulting in a dropped call. If such an event should occur, the lineman child 404 drops the call in state 618, performs any necessary cleanup in state 610 and returns to idle state 602 to await the next incoming or outbound call to be processed.

Figure 7:
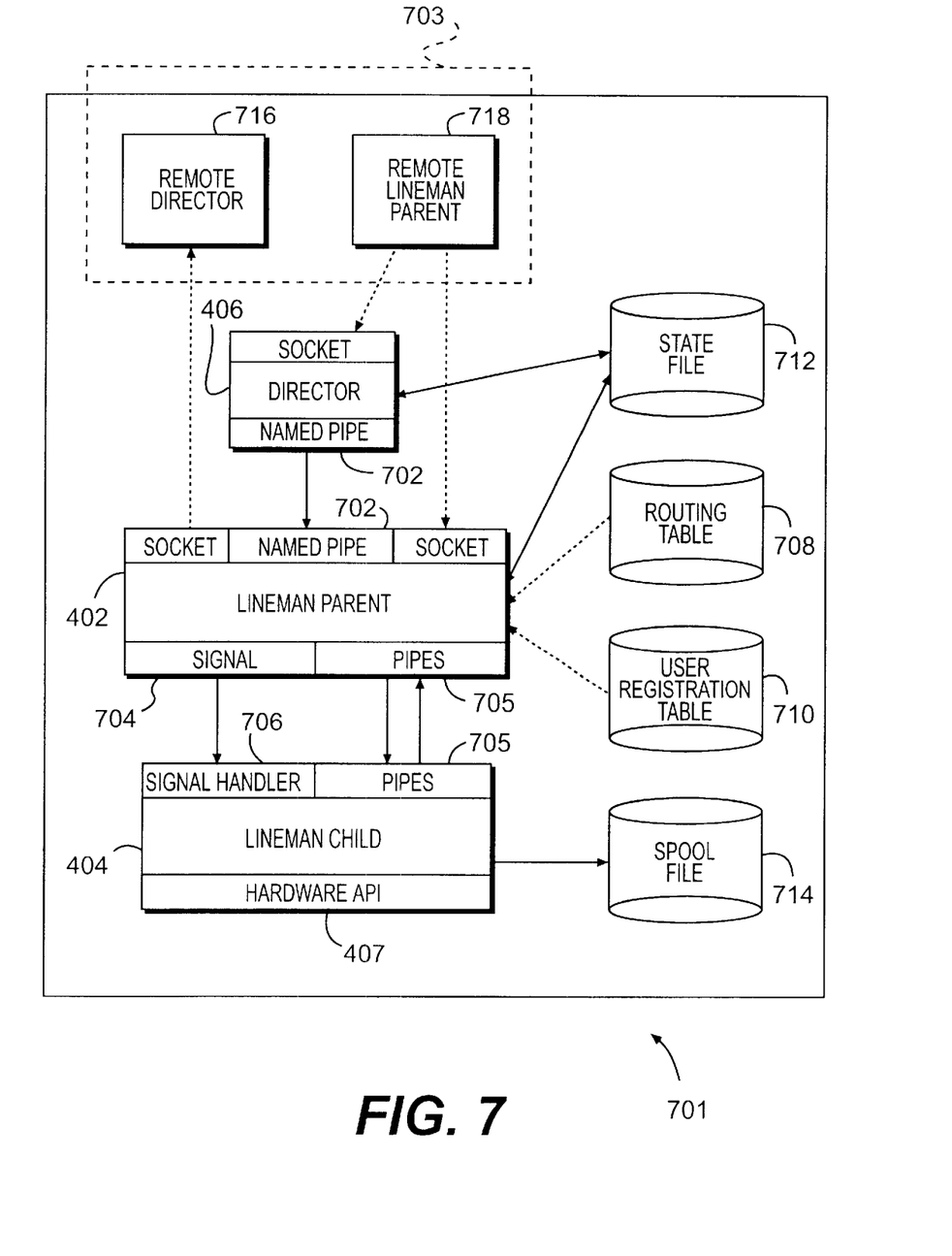
FIG. 7 is a schematic diagram of the interconnections on a local lineman

FIG. 7 is a schematic diagram of the preferred interconnections on a local lineman 701, and how the local lineman preferably connects to a remote lineman 703. Remote lineman 703 contains a remote director 716 and a remote lineman parent 718. In the preferred embodiment, remote lineman also contains at least a child lineman (not shown). As described above, the local lineman 701 contains a lineman child 404, a lineman parent 402, a lineman director 406, and preferably a hardware API 407. Referring to FIG. 3, for example, the local lineman executes on the sending DEM server 304 and the remote lineman executes on the receiving DEM server 306.

Referring back to FIG. 7, in the preferred embodiment, the lineman director 406 communicates with the lineman parent via a named-pipe 702. A "pipe" is a well-known construct for interprocess communication. The lineman parent 402 communicates with the lineman child 409 through pipes 705. In addition, lineman parent 402 can signal lineman child 404 about certain events, including, for example, detection of an inbound call, by sending signal 704 to a signal handler 706 running on lineman child 404.

Local lineman 701 also accesses to several files and tables, which it uses to process inbound and outbound DEMs. In the preferred embodiment, there is a routing table 708, a user registration table 710, a state file 712 and a spool file 714.

The data tables 708 and 710 contain various information required by lineman 701. In the preferred embodiment, both data tables 708 and 710 are designed to be located somewhere on the network.

The routing table 708 is used by an inbound lineman to determine a suitable outbound lineman with which to conduct a DEM transaction. In the preferred embodiment, the routing table 708 contains the following information:

| \_Routing Table\_ | | | |
|---|---|---|---|
| FIELD TYPE | FIELD SIZE | FIELD FLAGS | DESCRIPTION |
| segNumber | int | N/A | NOT NULL - A unique, server maintained sequence number. This can be used by an administration utility. |
| routingPattern | char | 64 | N/A - This is used to match against a given phone number. The pattern should be constructed so as to match/not match a fully qualified phone number. In the preferred |

-continued

Routing Table

| FIELD TYPE | FIELD SIZE | FIELD FLAGS | DESCRIPTION |
| --- | --- | --- | --- |
| | | | embodiment, this feature is implemented using the CLIKE function found in MiniSQL and should thus be portable. |
| hostName | char | 64 | NA - This is the name of the host that services this pattern. The hostname may be followed by an optional parentheses delimited list of port numbers, which if present, informs the inbound Lineman to request only a channel from that list. If the port number list is not present or is empty then the inbound lineman will request the next available port. The syntax of this field is: hostName [(a,b,c,d)] |
| matchPriority | int | N/A | N/A - This field is used to sort out multiple pattern matches. Matches with a higher priority are processed before matches with lower priorities. If two or more patterns have the same priority then the order in which they are processsed is undefined (and probably random). |
| startTimeofDay | int | N/A | N/A - A value of zero denotes that this hostName will service the routingPattern at all times of the day. Any other value denotes, in military time, the time of day after which this hostName will service the pattern. The time of service is terminated by the value in endTimeOfDay. The time must be stored adjusted to UTC. |
| endTimeOfDay | int | N/A | N/A - This field denotes, in military time, the time of day after which this routingPattern is no longer serviced by hostName. If startTimeOfDay is not zero and this field is zero then the pattern will be ignored. If this field is less than startTimeOfDay then this pattern will be ignored as well. The time must be stored adjusted to UTC. |
| comment | char | 64 | N/A - A text comment. |
| status | int | N/A | NOT NULL - This is the status of the pattern. It must be one value from this table:<br>Value Meaning<br>1 Enabled - this is an active pattern.<br>2 Disabled - this is an inactive pattern.<br>3 New - this is an inactive pattern that is currently under testing. |

Copyright, 1997, Open Port Technology, Inc. All Rights Reserved.

The user registration table 710 contains data concerning the user service provision side of the system incorporating the present invention. In the preferred embodiment, the user registration table 710 contains the following information:

User Registration Table

| FIELD TYPE | FIELD SIZE | FIELD FLAGS | DESCRIPTION |
| --- | --- | --- | --- |
| userId | char | 64 | KEY, NOT_NULL - This is the main user identification within the preferred embodiment. It is assigned by a configuration utility. It is generated based on a unique sequence number and the name of the host where the configuration Utility is currently running. This can allow for domains to be introduced at a later time without impacting existing systems. |
| nspUserId | char | 64 | KEY, NOT_NULL - This is the user's ID within the service provider's own billing system. |
| status | intr | N/A | NOT NULL - This is the status of the pattern. It must be one value from this table:<br>1 Enabled - this user's account is active and inbound connections from this user will be accepted.<br>2 Disabled - this user's account is inactive and inbound connections from this user will be rejected. |
| firstName | char | 24 | NOT NULL - The user's first name. |
| lastName | char | 32 | NOT NULL - The user's last name. |
| companyName | char | 64 | NOT NULL - The user's company name. |
| configFile | char | 128 | N/A - The URL of an optional text file containing user specific configuration parameters. |
| comment | char | 64 | N/A - A text comment. |

Copyright, 1997, Open Port Technology, Inc. All Rights Reserved.

The state data file 712 and spool data file 714 are preferably located locally on lineman 701. State data file 712 contains the current state of each DEM channel and lineman. In the preferred embodiment, the state data file 712 is a binary flat file, which contains the current state of each fax channel and lineman.

Local lineman 701 communicates with remote lineman devices, for example lineman 703 using conventional socket communication. Lineman parent 402 receives information from remote lineman parents, for example, remote lineman parent 718. The following table illustrates the communication steps between the child and parent lineman processes during an inbound request of the preferred embodiment.

| CHILD ACTION | PARENT STEP | PARENT ACTION | CHILD STEP |
|---|---|---|---|
| 1 | Phone rings. Can I answer it? | | |
| | | 1 | Look in state file and update record. Send back ANSWER_PHONE acknowledgement. |
| 2 | Answer the phone. Collect TDR data. Send all of that to parent. Can I do T.30 now and at what connection speed? | | |
| | | 2 | Validate USER ID. Perform LCR on destination phone number. Establish connection with remote lineman director. Wait for remote lineman parent to return T.30 success data. Send back T30_PROCEED acknowledgement. |
| 3 | Initiate T.30 with appropriate connect speed and other T.30 data from receive end. Send CONVERSATION_STARTED message to parent. | | |
| 4 | Collect data block n for page m. Send data block to parent. | | |
| | | 3 | Receive data block n for page m. Forward data block to remote lineman parent. |
| 5 | Receive EOP (end of page). Can I acknowledge the new EOP? | | |
| | | 4 | Send EOP to remote lineman parent. Wait for acknowledgement of page. Send EOP_PROCEED. |
| 6 | Acknowledge EOP. Continue with next page. | | |
| | | 5 | Continue processing pages sent up from lineman child. |
| 7 | Receive EOT (end of transmission). Can I ACK the new EOT? | | |
| | | 6 | Send EOT to remote lineman parent. Wait for acknowledgement of EOT. Send EOT_PROCEED. |
| 8 | Acknowledge EOT. | | |
| 9 | Cleanup. | 7 | Cleanup. |

Copyright, 1997, Open Port Technology, Inc. All Rights Reserved.

One important aspect of the present invention indicated by the table is that the lineman parent can issue acknowledge messages immediately in order to achieve immediate store-and-forward processing. It should be noted that the present invention is not limited to DEM communication of fax messages, or DEM communication using the T.30 protocol. Rather, the present invention can be used to transmit any DEM using any desired protocol over a data communications network.

In the preferred embodiment, several operating system level commands are available to control the Lineman process.

Copyright, 1997, Open Port Technology, Inc. All Rights Reserved.

- rtf lineman start [all| range-of-lines]
  - Starts a lineman parent.
  - Each lineman parent is its own master, and is started separately.
  - The Lineman Parent creates the Lineman Child to control the appropriate fax channel.
  - Each Parent can die or rebirth child on child death (this is controlled via signal handler and the configuration for that particular channel).
- rtf lineman stop [all| range-of-lines]
  - Stops one or more lineman parents.
  - The lineman parents are responsible for stopping their children at the appropriate time.
- rtf director start
  - Starts a lineman director daemon.
  - The lineman director has access to current line availability information and grants access to available linemen and their fax channels.
  - A binary flat file, called the state file, contains the current state of each fax channel and lineman.
- rtf director stop
  - Stops a lineman director.
  - Stopping the lineman director prevents the local lineman from participating in any outbound DEM transactions.
  - A stopped lineman director does not prevent the local lineman from initiating outbound DEM transactions.
- rtf message start
  - Starts a message handler daemon.
  - The message handler listens on a named pipe or FIFO for connections from processes on the local host.
  - The message handler also connects to the configured central message server and forwards messages based on a current configuration.
  - The message handler conducts all logging to disk, SNMP traps, etc.
- rtf message stop
  - Stops a message handler daemon.
  - Once the message handler is stopped, all log messages are sent to the local syslog daemon.
- rtf monitor start
  - Starts the monitor daemon.
  - Lock file keeps more than one monitor from running.
- rtf monitor stop
  - Stops a monitor daemon.
  - Certain important activities are associated with the monitor daemon and stopping the monitor daemon will have an adverse affect on the performance of the node.
- rtf start
  - This command attempts to start every non-running component on the node.

- rtf [-force] stop
  - This command attempts to stop every running component on the node. The -force flag causes a more vicious form of stop: all processes that do not stop on their own accord are forced to stop via kill (1). This flag is used as a last resort.
- rtf state
  - This command reports on the state of every configured component on the node.

Copyright, 1997, Open Port Technology, Inc. All Riots Reserved

The present invention also provides a secondary path for DEM transmission using store-and-forward servers 316 and 318. If the primary path over the DCN (through DEM servers 304 and 306) is not available for some reason, the DEM is sent through the secondary path. The secondary path is itself a DCN. The secondary path includes two store and forward servers 316 and 318. Referring to FIG. 3, store-and-forward server 316 is operatively coupled to DEM server 304 and store-and-forward server 318. Store-and-forward server 318 is operatively coupled to DEM server 306 and store-and-forward server 316.

When a DEM cannot be transmitted over the primary DCN 312, the DEM is sent to store-and-forward server 316. Store-and-forward 316 stores the DEM. It then attempts to establish communication with store-and-forward server 318. Once communication is established, store-and-forward server 316 transmits the DEM to store-and-forward server 318. Store-and-forward server 318 transfers the DEM to DEM server 306. DEM server 306 sends the DEM to MCD 3r when MCD 3r is available to receive it. Using the secondary path, real-time performance is achieved because the store-and-forward devices can transfer the DEM as soon as the MCD 3r is available to receive it.

Store-and-forward servers 316 and 318 can be any computer system that can be configured to perform the functions described herein. Such configuration would be well within the knowledge of those skilled in the art using the disclosure contained herein.

In the preferred embodiment of the present invention, a TCP/IP-based network replaces the phone company's inter-site network for the transport of a DEM from MCD 3s to MCD 3r. Because the lineman parent and child processes operating on the DEM servers are made aware of the protocol employed by MCDs 3s and 3r, the present invention allows for message communication according to any communication protocol, including the native protocol of the devices performing the communication.

It should be noted that the present invention is not limited to telephony connections using a PSTN. Rather, the present invention is equally applicable to any telephony connection from point to point. Thus, in addition to being applicable to PSTN telephony communication, the present invention is applicable to any private network, direct connect (e.g., PBX-to-PBX) network, or any combinations thereof Using the least cost routing techniques described in the U.S. patent application Ser. No. 08/529,923 the flexibility of the present invention is increased. With such techniques, the various remote lineman can better select the correct node to which to transmit a particular DEM.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for controlling transmission of a digitally encoded message (DEM), comprising:

a first message communicating device (MCD) for generating the DEM;

a first node coupled to said first message device having one or more ports for transmitting the DEM over a data network;

a first control process on said first node;

a second node having one or more ports for receiving a DEM that has been transmitted by said first node over the network;

a second message communicating device for receiving the DEM from said second node; and a protocol by which said first and second control processes establish a communication path through the data network over which a portion of the DEM is transmitted from the first node to the second node within a minimum latency time to avoid loss of synchronization due to expiration of a maximum time a portion of the DEM can take to reach the second node before the second node disconnects the communication path and a confirmation of each portion of the DEM transmitted is received.

2. The system of claim 1, wherein said first control process, further comprises:

a detector to determine the presence of a request for service caused by the DEM;

a locator to locate and reserve an available port on said first node; and wherein the communication path is established by said first control process through said available port.

3. The system of claim 2, wherein said first control process comprises:

a parent process to perform network functions; and a child process to perform hardware and telephony functions.

4. The system of claim 3, wherein said second control process comprises:

a second parent process to perform network functions; and a second child process to perform hardware and telephony functions.

5. The system of claim 4, wherein said communication path is established between said first and second child processes.

6. The system of claim 2, wherein the first control process further comprises:

a caller to place an outbound call to the second control process;

a second detector to determine when said communication path with said second control process has been established; and wherein said second control process sends DEM to said first control process over said communication path.

7. The system of claim 6, wherein said first control process determines that said second node is the destination of the DEM through a least-cost routing determination.

8. The system of claim 1, wherein at least one of said first and second MCDs is a facsimile machine.

9. The system of claim 1, further comprising a user interface by which a system administrator can access maintenance information corresponding to system performance.

10. The system of claim 1, further comprising:

a secondary path for transmission of DEMs; and wherein said protocol further determines whether the DEM can be transmitted over the data network or over the secondary path.

11. The system of claim 1, wherein said first MCD comprises said first node.

12. The system of claim 1, wherein said second MCD comprises said second node.

13. The system of claim 1, wherein said data network is one of an intranet and the Internet.

14. The system of claim 1, wherein said data network is one of a wide-area network and a local-area network.

15. A method for transmitting a digitally encoded message DEM over a data network, comprising the steps of:

(a) generating the DEM in a message communicating device (MCD);

(b) sending the DEM to a transmitter node attached to a data network for subsequent transmission of the DEM over the data network;

(c) determining a suitable receiver node attached to the data network for the DEM;

(d) establishing a communication path between the transmitted node and the receiver node;

(e) transmitting a portion of the DEM from the transmitter node to the receiver node through the data network within a minimum latency time and to avoid loss of synchronization due to expiration of a maximum time a portion of the DEM can take to reach the second node before the second node disconnects the communication path;

(f) receiving a confirmation for each portion of the DEM transmitted; and (g) receiving the DEM at the receiver node.

16. The method of claim 15, wherein said establishing step further comprises the steps of passing messages between the transmitter and receiver nodes.

17. The method of claim 15, wherein said determining step further comprises the steps of:

(a) choosing to transmit the DEM over the data network or a secondary path;

(b) transmitting the DEM over the data network when synchronization required for the DEM transmission can be maintained; and (c) transmitting the DEM over the secondary path when there is no synchronization between the transmitted and receiver nodes.

18. The method of claim 17, wherein said determining step, further comprises the step of determining the least cost route over which to transmit the DEM.

19. The method of claim 15, wherein said transmitting step comprises the step of transmitting said DEM over one of a wide-area network and a local-area network.

20. The method of claim 15, wherein said transmitting step comprises the step of transmitting said DEM over one of an intranet and the Internet.

21. The method of claim 15, wherein the step of generating the DEM comprises the step of generating a facsimile message.

22. A communication node for establishing a communication path over a data network with a remote node with a guaranteed maximum time for a portion of a digitally encoded message (DEM) to be sent from the communication node to the remote node through the data network, comprising a communication control process executing on the communication node to communicate with a remote communication control process executing on the remote node to establish the communication path and to control transmission of the DEM through the data network to the remote node with a guaranteed latency so as to avoid loss of the communication channel due to expiration of a maximum synchronization time allowed for the portion of the DEM to transmitted from the communication node to the remote node, and wherein the communication control process receives a confirmation for each portion of the DEM transmitted.

23. The communication node recited in claim 22, wherein the communication control process comprises:

a child process executing on the communication node for controlling communications between the communication node and a message device on which the DEM is created; and a parent process executing on the communication node for controlling communication between the communication node and the remote node, wherein the parent process communicates with a remote parent process executing on the remote node to establish the communication path with the guaranteed latency.

24. The communication node recited in claim 22, wherein the communication control process sends the DEM using an alternative communication path, where a maximum latency that avoids loss of the communication path is not successfully established.

25. The communication node recited in claim 22, wherein the communication path is determined using least cost routing.

26. The communication node recited in claim 22, wherein the DEM is a facsimile message.

27. The communication node recited in claim 22, wherein the communication control process, comprises:

a monitoring process to monitor a predetermined port for the presence of an incoming DEM; and an allocation process to identify and allocate an available port for receiving the DEM.

28. The communication node recited in claim 27, wherein the communication node further comprises a notification process to notify a sender of a DEM that there are no ports available to receive the DEM.

* * * * *